United States Patent
Berniard et al.

(10) Patent No.: US 11,066,224 B2
(45) Date of Patent: Jul. 20, 2021

(54) PACKAGING CONSTRUCTIONS, MATERIALS, AND METHODS

(71) Applicant: 3M INNOVATIVE PROPERTIES COMPANY, St. Paul, MN (US)

(72) Inventors: Tracie J. Berniard, St. Paul, MN (US); David K. Bruechert, Lakeland, MN (US); Lisa M. Miller, Spring Valley, WI (US); Manoj Nirmal, St. Paul, MN (US); Andrew P. Singer, St. Paul, MN (US); Lisa E. Warren, Plymouth, MN (US); Matthew T. Zabel, Lake Elmo, MN (US); Mitchell A. F. Johnson, Woodbury, MN (US); Shannon R. A. Harnden, Lake Elmo, MN (US); Mary L. Brown, Roseville, MN (US); Caleb W. Brian, North St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/952,432

(22) Filed: Nov. 19, 2020

(65) Prior Publication Data
US 2021/0070522 A1    Mar. 11, 2021

Related U.S. Application Data

(63) Continuation of application No. 16/962,609, filed as application No. PCT/IB2019/050532 on Jan. 22, 2019.
(Continued)

(51) Int. Cl.
*B65D 81/03* (2006.01)
*B65D 75/30* (2006.01)
*B65D 81/05* (2006.01)

(52) U.S. Cl.
CPC ............ *B65D 81/03* (2013.01); *B65D 75/30* (2013.01); *B32B 2250/24* (2013.01);
(Continued)

(58) Field of Classification Search
CPC ........ B65D 25/16; B65D 75/30; B65D 81/03; B65D 81/052; B65D 2313/10; B32B 2250/24; B32B 2553/026
(Continued)

(56) References Cited

U.S. PATENT DOCUMENTS

| 3,304,219 A | 2/1967 | Nickerson |
| 3,507,728 A | 4/1970 | Bock |

(Continued)

FOREIGN PATENT DOCUMENTS

| GB | 666501 | 2/1952 |
| WO | WO 2020-036787 | 2/2020 |
| WO | WO 2020-141376 | 7/2020 |

OTHER PUBLICATIONS

Farber, Madeline, "Consumers Are Now Doing Most of Their Shopping Online," Jun. 8, 2016, *Fortune Managazine*, [retrieved online Oct. 9, 2020] <https://fortune.com/2016/06/08/online-shopping-increases>, 3 pages.
(Continued)

*Primary Examiner* — Luan K Bui
(74) *Attorney, Agent, or Firm* — Eric E. Silverman (57) ABSTRACT

The present disclosure relates to improved packaging materials and/or constructions, and methods of making and using them.

9 Claims, 4 Drawing Sheets

Related U.S. Application Data (60) Provisional application No. 62/620,031, filed on Jan. 22, 2018, provisional application No. 62/794,617, filed on Jan. 19, 2019.

(52) U.S. Cl.
CPC ...... *B32B 2553/026* (2013.01); *B65D 81/052* (2013.01); *B65D 2313/10* (2013.01)

(58) Field of Classification Search
USPC ..................................... 206/484, 522; 383/3
See application file for complete search history.

(56) References Cited

U.S. PATENT DOCUMENTS

| | | | |
|---|---|---|---|
| 3,556,894 A | | 1/1971 | Bernard |
| 3,847,724 A | | 11/1974 | Powers |
| RE30,098 E | * | 9/1979 | Titchenal ............... B32B 27/00 206/484 |
| 4,321,297 A | | 3/1982 | Adelman |
| 4,647,258 A | | 3/1987 | Massarsch |
| 4,901,372 A | | 2/1990 | Pierce |
| 5,268,228 A | | 12/1993 | Orr |
| 5,860,524 A | * | 1/1999 | Weder .................... B65D 25/10 206/423 |
| 6,287,658 B1 | | 9/2001 | Consentino |
| 8,568,029 B2 | | 10/2013 | Kannankeril |
| 9,132,283 B2 | | 9/2015 | Calkins |
| 9,631,380 B2 | | 4/2017 | Kadlec |
| 9,636,269 B2 | | 5/2017 | Campbell |
| 2002/0110675 A1 | * | 8/2002 | Finestone ............... B32B 29/00 428/215 |
| 2003/0203164 A1 | | 10/2003 | Healy |
| 2004/0209024 A1 | | 10/2004 | Finestone |
| 2005/0031233 A1 | | 2/2005 | Varanese |
| 2006/0019058 A1 | | 1/2006 | Dickins |
| 2006/0024495 A1 | * | 2/2006 | Romling ............. B29C 66/1122 428/343 |
| 2006/0210773 A1 | * | 9/2006 | Kannankeril ..... B29C 66/81261 428/166 |
| 2006/0231446 A1 | | 10/2006 | Venis |
| 2007/0045903 A1 | * | 3/2007 | Day .......................... B32B 3/28 264/454 |
| 2007/0095711 A1 | * | 5/2007 | Thompson ........... B65D 5/5088 206/522 |
| 2008/0093426 A1 | | 4/2008 | Kircher, Jr. |
| 2009/0252951 A1 | | 10/2009 | Ozaki |
| 2010/0143663 A1 | * | 6/2010 | Orologio ................. B32B 27/08 428/178 |
| 2011/0120899 A1 | * | 5/2011 | Sorensen ............... B65D 81/03 206/522 |
| 2012/0248177 A1 | * | 10/2012 | Beaulieu ................ B65D 81/03 229/80.5 |
| 2016/0023430 A1 | | 1/2016 | Calkins |

OTHER PUBLICATIONS

"For every Amazon package it delivers, the Postal Service loses $1.46," Sep. 1, 2017, *Washington Examiner*. [retrieved online Oct. 7, 2020] <https://www.washingtonexaminer.com/for-every-amazon-package-it-delivers-the-postal-service-loses-146>, 2 pages.
"Packaged-Products for Parcel Delivery System Shipment 70 kg (150 Ib) or less", ISTA 3 Series General Simulation Performance Test Procedure, 2008, pp. 1-28.
"Small Package Type", ISTA 3A Small Parcel Ship Testing Procedure, 2019, pp. 1-6.
"Standard Test Method for Water Resistance of Shipping Containers by Spray Method", ASTM International D951-17, 2018, pp. 1-3.
International Search Report for PCT International Application No. PCT/IB2019/050532, dated Apr. 3, 2019, 5 pages.

\* cited by examiner

PACKAGING CONSTRUCTIONS, MATERIALS, AND METHODS

CROSS REFERENCE TO RELATED APPLICATIONS

This application is a continuation of U.S. patent application Ser. No. 16/962,609, filed Jul. 16, 2020, which is a national stage filing under 35 U.S.C. 371 of PCT/IB2019/050532, filed Jan. 22, 2019, which claims the benefit of U.S. Provisional Application No. 62/620,031, filed Jan. 22, 2018, and U.S. Provisional Application No. 62/794,617, filed Jan. 19, 2019, the disclosures of which are incorporated by reference in their entireties herein.

TECHNICAL FIELD

The present disclosure relates to improved packaging materials and/or constructions, and methods of making and using them.

BACKGROUND

In 2016, consumers bought more things online than in stores. *Consumers Are Now Doing Most of their Shopping Online, Fortune Magazine, Jun.* 8, 2016. Specifically, consumers made 51% of their purchases online and 49% in brick-and-mortar stores. Id. One result of this change in consumer behavior is the growing number of packages mailed and delivered each day. Over 13.4 billion packages are delivered to homes and businesses around the world each year (about 5.2 billion by the United States Postal Service, about 3.3 billion by Fed Ex, and about 4.9 billion by UPS). While delivery of non-package mail is decreasing annually, package delivery is growing at a rate of about 8% annually. This growth has resulted in 25% of the U.S. Postal Service's business being package delivery. Washington Examiner, "*For every Amazon package it delivers, the Postal Service loses* $1.46," Sep. 1, 2017. Amazon ships about 3 million packages a day, and Alibaba ships about 12 million packages a day.

Further, it is not just businesses shipping packages. The growing Maker culture creates opportunities for individuals to ship their handmade products around the world through websites like Etsy™. Further, the increased focus on sustainability causes many consumers to resell used products on sites like eBay™ rather than throw them into landfills. For example, over 25 million people sell goods on eBay, and over 171 million people buy these goods.

Individuals and businesses shipping these goods basically have two options: (1) boxes including the product to be shipped, optional cushioning, and lots of air; or (2) cushioned pouches or envelopes of the type generally shown in FIG. 1.

SUMMARY

The inventors of the present disclosure recognized disadvantages of each of these two options. Specifically, both businesses and individuals shipping products in boxes need to balance (1) ensuring the item is not broken or injured during transit; (2) shipping costs (which are dependent on both weight and box size in the US); and (3) the hassle of storing a multitude of different size boxes to ensure that the product is being shipped in the smallest, safest box. The end result is that products are often mailed in boxes that are not correctly sized, resulting in increased shipping and transit costs and material waste. With respect to cushioned envelopes of the type generally shown in FIG. 1, such cushioned envelopes are typically provided in a variety of pre-determined sizes to permit selection of a mailer of suitable size for a particular need. In order to accommodate a variety of sizes, it is necessary to maintain an inventory of differently sized mailers. Because mailers are typically of somewhat bulky form in order to provide desired protective performance, maintaining a suitably well-stocked inventory of mailers presents a storage challenge to both individuals and businesses. Further, some envelopes have insufficient cushioning to permit their use for many items.

For at least these reasons, the inventors of the present disclosure sought to create a packaging construction that is at least one of easier to use, equally or more protective to the item(s) being shipped, more sustainable, lower cost, requires less material to effectively package/ship an item, requires less time to effectively package/ship an item, and/or results in less waste material to effectively package/ship an item.

The inventors of the present disclosure invented a novel package construction that is at least as protective to item(s) being shipped as currently available offerings but that offers greater customizability than existing packaging options. For example, in some embodiments, the greater customizability is provided by offering a single material that can be used to ship almost any sized item. This eliminated the need to store multiple size boxes or mailer envelopes. As another example, in some embodiments, the greater customizability is provided in that the material used to ship the item(s) is wrapped directly around the item so that its profile generally matches, mimics, or mirrors of the size/profile/dimensions of the item(s) being shipped. This eliminates wasted space in a box as well as eliminates the need for protective materials being stuffed into the box to keep the item from rattling around (and thus potentially being damaged) in the box. It also makes the packaging more sustainable/less wasteful because of its elimination of the need for packaging materials stuffed in the box to keep the item secure in the box. Further, this customizability can result in lowered shipping costs since shipping costs are based both on weight and size of the package to be shipped.

Some packaging or shipping materials of the present disclosure include an outer layer portion; a cohesive portion; and a cushioning portion between the outer layer portion and the cohesive portion. For purposes of clarity, the packaging or shipping materials of the previous sentence can include layers in between or additional to the layers, materials, or portions described above. Further, any, all, or none of the outer layer or portion, cohesive layer, material, or portion, and cushioning layer, material, or portion can include multiple layers.

In some embodiments of a packaging or shipping construction or material, the cushioning portion includes bubble wrap or bubble film that includes a film portion and a bubble portion; and the film portion of the bubble wrap or bubble film is adjacent to the outer layer portion; and the bubble portion of the bubble wrap or film is adjacent to the cohesive portion.

In some embodiments of a packaging or shipping construction or material, the cushioning portion includes bubble wrap or bubble film that includes a film portion and a bubble portion; the bubble portion of the bubble wrap or bubble film is adjacent to the outer layer portion; and the film portion of the bubble wrap or film is adjacent to the cohesive portion.

In some embodiments, of a packaging or shipping construction or material, the cushioning portion includes spaced air or gas-filled bubbles that are capable of providing cushioning to the packaging construction; and one of the cohesive portion and/or the outer layer portion act as a film layer adjacent to the air or gas-filled bubbles. For purposes of clarity, the packaging or shipping construction can include layers, materials, or portions in between or additional to the layers, materials, or portions of the previous sentence. Further, any, all, or none of the outer layer or portion, cohesive layer, material, or portion, and cushioning layer, material, or portion can include multiple layers.

The inventors of the present disclosure also invented novel methods of using the packaging or shipping constructions and materials described herein. One such method involves obtaining a first piece of packaging or shipping material of a desired shape and size; obtaining a second piece of packaging material of a desired shape and size; placing the first piece of packaging material such that the cohesive layer or material faces the user and/or is exposed to the user; placing the item to be shipped on the cohesive layer of the packaging material; placing the second piece of packaging material on top of the first piece of packaging material and the item to be shipped such that the cohesive layers or materials of each piece of packaging material are facing one another; and pressing the first and second pieces of packaging material together around the item to be shipped.

Another such method involves obtaining a piece of packaging or shipping material of a desired shape and size; placing the piece of packaging material such that the cohesive layer or material faces the user and/or is exposed to the user; placing the item to be shipped on the cohesive layer of the packaging material; folding the packaging material over the item to be shipped; and pressing the packaging material around the item to be shipped. In some embodiments, pressing the packaging material together causes the opposing cohesive layers or materials of the packaging material to come into contact with one another and thereby enclosing the article or items to be shipped. In some embodiments, pressing the packaging material together causes the formation of cohesive-cohesive bonds between the adjacent layers of cohesive material.

In some embodiments, at least one of the outer layer portion, the cushioning portion, and the cohesive portion is single layer or multilayer. In some embodiments, the cushioning portion includes at least one of bubble wrap, bubble film, foam, expanded foam, structured foam, contoured foam, a structured polymer, spaced air or gas-filled bubbles that are capable of providing cushioning, and combinations thereof. In some embodiments, the cushioning portion has a thickness of between about $1/32$ inch and about 4 inches. In some embodiments, the cushioning portion has a thickness of greater than about $1/332$, or about $7/64$ inch, or about $1/4$ inch, or about $1/2$ inch, or about $3/4$ inch, or about 1 inch. In some embodiments, the cushioning portion has a thickness of less than about 4 inches, or less than about 3 inches, or less than about 2 inches, or less than about 1 inch, or less than about $3/4$ inch, or less than about $1/2$ inch. In some embodiments, the cushioning portion provides cushioning that is equal to or greater than that provided by existing packaging or shipping constructions.

In some embodiments, the outer portion is single layer or multi-layer. In some embodiments, the outer portion is at least one of single-ply, double-ply, or triple-ply. In some embodiments, the outer portion includes at least one of paper, plastic, a nonwoven, or combinations thereof. In some embodiments, the outer portion is a two-ply paper/plastic laminate. In some embodiments, the outer portion is a three-ply paper/plastic/paper laminate. In some embodiments, the outer portion includes at least one of polypropylene, polyethylene, polyurethane, vinyl, polyester, and/or a copolymer of any of these. In some embodiments, the outer portion includes an oriented or biaxially oriented plastic. In some embodiments, the outer portion includes at least one of a water-resistant, writable, and/or tear-resistant layer or material. In some embodiments, the outer portion has a thickness of greater than 1 mil. In some embodiments, the outer portion has a thickness of greater than 2 mil.

In some embodiments, the cohesive portion includes at least one of natural rubber, synthetic polyisoprene, block copolymer, amorphous poly alpha-olefin, polyurethane, and blends or combinations of the foregoing. In some embodiments, the cohesive portion has a tack of less than 30 grams when measured by a TA-XT2i Texture Analyzer according ASTM D-2979. In some embodiments, the cohesive portion comprises less than about 20 wt % tackifier, plasticizer, and/or mixtures thereof based on the total weight of the cohesive composition.

Some embodiments further include an adhesive portion. In some embodiments, the adhesive portion is between the outer portion and the cushioning portion and/or between the cohesive portion and the cushioning portion. In some embodiments, the adhesive portion is a layer in a multilayer outer portion, cushioning portion, or cohesive portion.

In some embodiments, the packaging material is a roll good. In some embodiments, the packaging material passes both the Water Resistance Test, the Water Presence Test, and the Package-Drop Test, all tests as described herein.

BRIEF DESCRIPTION OF DRAWINGS

In the following detailed description, reference may be made to the accompanying set of drawings that form a part hereof and in which are shown by way of illustration several specific embodiments. It is to be understood that other embodiments are contemplated within the scope of the present disclosure.

DETAILED DESCRIPTION

The present disclosure relates generally to packaging materials and/or packaging constructions and/or methods of making or using the packaging materials or constructions. Many different embodiments of the packaging material and/or packaging construction are described herein. The present disclosure also relates generally to methods of making and using the packaging materials and/or packaging constructions described herein.

Figure 2A:
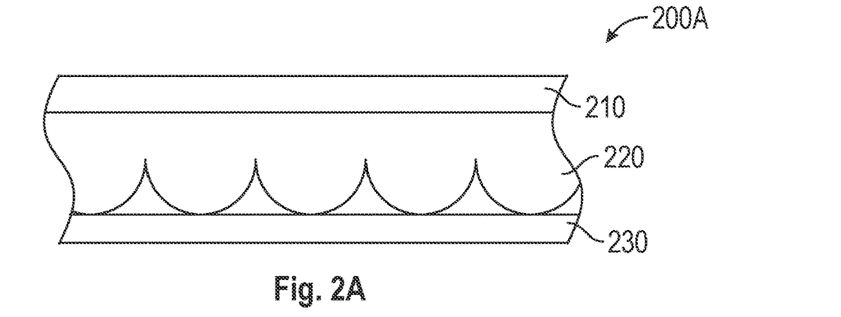
FIG. 2A is a cross-sectional side view of an exemplary embodiment of an exemplary construction of the packaging material of the present disclosure.

One exemplary embodiment of a packaging material is shown in FIG. 2A. Packaging material 200A includes an outer layer 210, a cushioning layer 220, and a cohesive layer 230. In the specific implementation shown in FIG. 2A, cushioning layer 220 is shown as a bubble wrap layer, but other cushioning layers may be used, as is described in greater detail herein. Any of the features shown in FIG. 2A can be optionally used in any and all of the constructions shown in any figures and/or described in any embodiments of the present disclosure.

Those of skill in the art will recognize that many changes may be made to this exemplary construction and still fall within the scope of the present disclosure. For example, the "bubble" portion of the cushioning layer is shown as facing the cohesive layer in FIG. 2. However, the "bubble" portion of the cushioning layer can face the outer layer instead. In such an embodiment, the film portion of the bubble wrap would face the cohesive portion. As another example, the cushioning layer 220 is shown as a single, integrated material. The cushioning layer or portion can be single or multi-layer. In some embodiments, the cushioning layer or portion includes a bubble portion and a bubble film portion. In some embodiments, the cushioning layer or portion includes a bubble portion, a bubble film portion, and a top film or protective film or layer directly adjacent to the bubble portion.

Figure 2B:
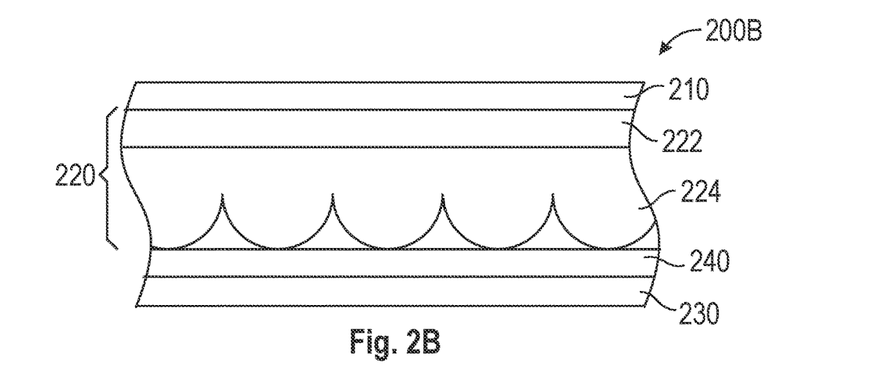
FIG. 2B is a cross-sectional side view of an exemplary embodiment of an exemplary construction of the packaging material of the present disclosure.

Another exemplary embodiment of a packaging material or packaging construction is shown in FIG. 2B. Packaging material 200B includes an outer layer 210, a multilayer cushioning layer 220, an adhesive layer 240, and a cohesive layer 230. In the specific implementation shown in FIG. 2B, cushioning layer 220 is shown as a multilayer bubble wrap layer including a film portion 222 and a bubble portion 224. Other cushioning layers or cushioning layer constructions (including those with single layers) may be used in the exemplary embodiment construction generally shown in FIG. 2B. Any of the features shown in FIG. 2B can be optionally used in any and all of the constructions shown in any figures and/or described in any embodiments of the present disclosure. Adhesive layer 240 is between cushioning layer 220 and cohesive layer 230. In some embodiments, adhesive layer is between outer layer 210 and multilayer cushioning layer 220 in addition to or instead of between cushioning layer 220 and cohesive layer 230. Those of skill in the art will recognize that many changes may be made to this exemplary construction and still fall within the scope of the present disclosure. For example, the "bubble" portion of the cushioning layer is shown as facing the cohesive layer in FIG. 2B. However, the "bubble" portion of the cushioning layer can face the outer layer instead.

Figure 3:
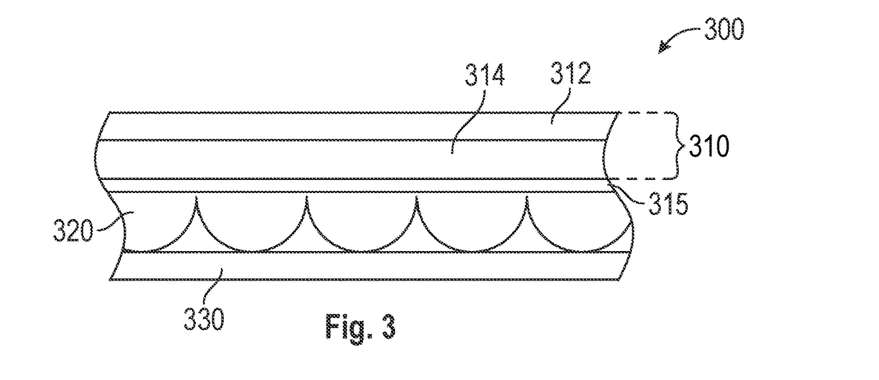
FIG. 3 is a cross-sectional side view of an exemplary embodiment of an exemplary construction of the packaging material of the present disclosure.

Another exemplary embodiment of a packaging material is shown in FIG. 3. Packaging material 300 includes a two-ply or two-layer outer layer 310, an adhesive layer 315, a cushioning layer 320, and a cohesive layer 330. In the specific implementation shown in FIG. 3, cushioning layer 320 is shown as a bubble wrap layer, but other cushioning layers may be used, as is described in greater detail herein. The bubble wrap can be single or multiple layer. In the specific implementation of FIG. 3, two-ply or two-layer outer layer 310 includes a paper layer 312 and a plastic layer 314 but any single or multi-layer construction of outer layer 310 may be used. Adhesive layer 315 holds outer layer 310 adjacent to cushioning layer 320. While adhesive layer 315 is not shown in all figures, it can be optionally used in the constructions shown in all figures and embodiments of the present disclosure. Any of the features shown in FIG. 3 can be optionally used in any and all of the constructions shown in any figures and/or described in any embodiments of the present disclosure. Those of skill in the art will recognize that many changes may be made to this exemplary construction and still fall within the scope of the present disclosure. For example, the "bubble" portion of the cushioning layer is shown as facing the cohesive layer in FIG. 2. However, the "bubble" portion of the cushioning layer can face the outer layer instead.

Figure 4:
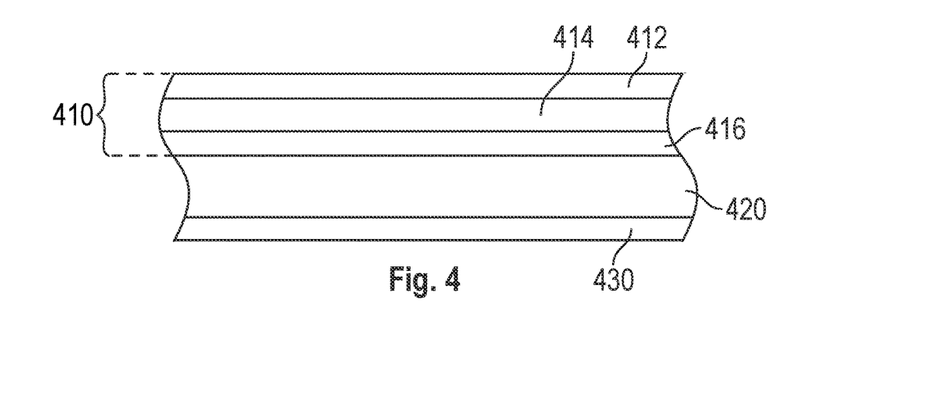
FIG. 4 is a cross-sectional side view of an exemplary embodiment of an exemplary construction of the packaging material of the present disclosure.

Another exemplary embodiment of a packaging material is shown in FIG. 4. Packaging material 400 includes a three-ply or three-layer outer layer 410, a cushioning layer 420, and a cohesive layer 430. In the specific implementation shown in FIG. 4, cushioning layer 420 is shown as a foam layer, but other cushioning layers may be used, as is described in greater detail herein. Three-ply or three-layer outer layer 410 includes a paper layer 412, a plastic layer 414, and a paper layer 416. Any single or multi-layer construction of outer layer 410 may be used. Outer layer 410 and cushioning layer 430 can be held together by, for example, adhesive, mechanical means, or lamination (e.g., thermal lamination). Any of the features shown in FIG. 4 can be optionally used in any and all of the constructions shown in any figures and/or described in any embodiments of the present disclosure.

In some embodiments, the packaging or shipping construction has a thickness of between about $\frac{1}{32}$ inch and about 4 inches, or between about $\frac{7}{64}$ inch and about 3 inches, or between about $\frac{1}{4}$ inch and about 2 inches, or between about $\frac{1}{2}$ inch and about 1 inch. In some embodiments, the packaging or shipping construction has a thickness of greater than about $\frac{1}{32}$ inch, or about $\frac{7}{64}$ inch, or about $\frac{1}{4}$ inch, or about $\frac{1}{2}$ inch, or about $\frac{3}{4}$ inch. In some embodiments, the packaging or shipping construction has a thickness of less than about 4 inches, or less than about 3 inches, or less than about 2 inches, or less than about 1 inch, or less than about $\frac{3}{4}$ inch, or less than about $\frac{1}{2}$ inch.

Outer Layer:

The outer layer can be any desired outer layer that provides at least some of the features described herein. In some embodiments, the outer layer is a single layer. In some embodiments, the outer layer includes multiple layers. As is described in greater detail below, in some embodiments, the outer layer is at least one of single-ply, double-ply, or triple-ply and/or single layer or multi-layer. The multi-layer constructions can include any desired number of layers.

In embodiments where the outer layer is single ply, the outer layer material may be a heavy weight paper (such as, for example, kraft paper or the like), a plastic film (such as, for example, MYLAR™), a nonwoven material (such as, for example, TYVEK™), or a treated paper (such as, for example, aluminized paper).

In some embodiments, the outer layer includes a paper layer, which can be coated paper, Kraft paper, or higher quality paper such as Bond or white paper. In some embodiments, the paper may be printable and/or metallized to obtain a decorative packaging material. In some embodiments, the metallized paper layer may also be provided with graphics thereon.

In some embodiments, the outer layer includes a plastic. In some embodiments, the plastic is printed, embossed, structured, or reinforced. In some embodiments, the plastic includes at least one of polypropylene, polyethylene, polyurethane, polyester, and/or a copolymer of any of these. In some embodiments, the polyethylene is at least one of a low density polyethylene, a metallocene linear low density polyethylene, linear low density polyethylene, a low density polyethylene, polypropylene, olefinic block copolymer(s), a high density polyethylene, and/or copolymers and/or blends of any of these.

In some embodiments, the plastic is a thermoplastic and/or olefin material. The plastic may be oriented uniaxially or biaxially to impart high-strength thereto. A biaxial orientation may be preferred for greatest strength. One or more of the surfaces of the plastic layer may be corona discharge treated to render one or more of them receptive to inks and printing. Further, if a decorative package is desired, the plastic may be metallized as by vacuum deposition.

In some embodiments, the outer layer is a multilayer plastic film. In some embodiments, the multilayer film includes one to seven layers. In some embodiments, the multilayer film includes more than seven layers. In some embodiments, the multilayer construction includes at least one of polypropylene, polyethylene, cyclic olefin copolymers, polyurethane, polyester, polyamide, and/or a copolymer of any of these. In some embodiments, the layer on the first major surface adjacent to the bubble wrap may contain a polymer that enables thermal bonding to the bubble wrap. Some exemplary layers capable of providing thermal bonding to the bubble wrap include, for example, those comprising low density polyethylene, linear low density polyethylene, metallocene linear low density polyethylene, polypropylene, olefinic block copolymers, and/or copolymers and/or blends of any of these. One or more of the layers of a multilayer outer layer may impart to the overall outer layer construction a low gas permeability that enables air retention in the bubble wrap. One or more of the layers in the multilayer construction may provide tear resistance properties. Some exemplary layers capable of providing tear resistance include, for example, those comprising low density polyethylene, linear low density polyethylene, metallocene linear low density polyethylene, polypropylene, olefinic block copolymers, polyamide, polyester, polyurethane, and/or copolymers and/or blends of any of these.

To impart specific appearances, one or more layers of the outer layer may be pigmented and/or include a filler/additive, for example, glitter. The outermost layer of a multilayer outer layer may also, for example, be receptive to inks, varnishes, and/or release coatings.

In some embodiments, the outer layer is a two-ply or two-layer construction or laminate. In some embodiments, the two-ply or two-layer construction or laminate is a paper/plastic construction or laminate. In some such embodiments, a paper layer is laminated to a plastic film layer. Another exemplary two-ply or two-layer outer layer or construction is a laminate that includes a water impermeable plastic film having a first corona discharge treated surface that is adhesively cold laminated to the paper layer.

In some such embodiments, the paper layer is cold laminated to the plastic layer. The cold lamination process enables the present packaging material to be manufactured at much higher speeds than when other adhesives, such as hot melt adhesives, are utilized, for example due to the additional time required for cooling of the hot melt adhesive before a secure bond is achieved. If hot melt adhesives were used instead of cold lamination for joining the plastic film to the paper, the heat of the adhesive could cause the film to shrink, thus causing a loss of strength. Also, the hot melt adhesive does not achieve its final bond strength until the adhesive cools, and the plastic film can shrink before this happens. Moreover, a wrinkled or curled product often results due to the difference in the high strength and low strength areas of the plastic film. The use of cold lamination is also advantageous when an oriented or biaxially-oriented plastic film is utilized. It is known that at elevated temperatures, such films relax and lose molecular orientation and strength. For example, when two sheets of biaxially-oriented polyester film are seamed together, using an ultrasonically-activated sealing bar to create internal friction and heat within the film, the films soften and fuse, with a resultant sealing line that is weak, such that the sheets then tend to tear along this line. Similar problems are encountered if an oriented film is exposed to high heat, such as if a hot melt adhesive would be used to join the film to the paper. Cold lamination utilizing a hot melt, solvent-based water-based, or transfer adhesive can produce a laminate that has high strength.

In some embodiments, the two-ply construction (or a portion thereof) is corona discharge treated. This treatment may be applied to the plastic immediately before the first corona discharge treated surface is adhesively laminated to the paper layer. This enables a strong bond to be achieved between the plastic and paper to form a paper-plastic film laminate having first and second opposed outer surfaces.

In some embodiments, the outer layer is three-ply. In some embodiments, the two-ply material(s) described above may further include an additional paper layer to form a paper-plastic-paper, three-ply laminate sheeting. The extra paper layer may be desirable for packaging objects with pointed edges or simply when a packaging material with more strength is desired. As the paper layers form the inner and outer sides of the packaging material, they can easily be printed with graphics or other indicia prior to application of the cushioning and/or cohesive material(s). This enables the packaging material to have one appearance on the outside of the package and another, different appearance on the side of the material that faces the item being shipped. When a three-ply paper/plastic/paper laminate is used, the outermost portion of the outer layer can easily be printed using any one of a variety of well-known techniques, including silk screening and the like. The innermost portion of the outer layer (e.g., the plastic film) provides moisture resistance to the article or item that is wrapped by the packaging material. Another exemplary outer layer is a three-ply laminate that includes a water impermeable plastic film having first and second corona discharge treated surfaces that are adhesively cold laminated to first and second paper layers. In some embodiments, the outer layer is more than three layers.

It may also be desirable that the packaging material have printable surfaces so that logos, messages, advertisements, emblems, trademarks or simply, addressee information etc., may be printed on the exterior or interior surfaces of the formed package. In this regard, the outer layer can include a printable surface. In some embodiments, the outer layer may include one or more corona discharge treated surface to render it receptive to inks so that it may exhibit graphics.

In some embodiments, the outer surface of the material should be able to be provided with indicia or other printed information. If the material itself is not receptive to such printed information, it should be treated to be receptive. For example, a plastic film of polyethylene that has the outer surface treated by a corona discharge can then be printed or provided with printed indicia. It is also possible, although less preferred, that the indicia be applied to the packaging material by an adhesive-backed sticker, label or the like.

In some embodiments, the outer layer has a thickness of greater than about 0.5 mils, or greater than 0.75 mils, or greater than 1 mil, or greater than 1.25 mils, or greater than 1.5 mils, or greater than 1.75 mils, or greater than 2 mils. In some embodiments, the outer layer has a thickness of less than 5 mils, or less than 4.5 mils, or less than 4.0 mils, or less than 3.5 mils, or less than 3 mils. In some embodiments, the outer layer has a thickness of between about 0.5 mils and about 5 mils, or between about 1 mil and about 4 mils, or between about 2 mils and about 3 mils. In some embodiments where the outer layer is paper, the outer layer has a thickness of greater than about 3 mils.

In some embodiments, at least a portion, and in some instances, substantially the entire, outer layer is writable (e.g., can be written on with conventional writing instruments such as pens, pencils, and/or markers). In some embodiments, this can be achieved by selecting materials for the outer layer that inherently provide that characteristic. In some embodiments, this can be achieved by treating at least a portion of the surface of the selected outer layer to impart desired writability and/or adhesion (e.g., applying an adhesive-backed paper sheet or label). In some embodiments, imparting adhesion involves treating the inside of the outer layer, which will also aid in bonding of an adhesive and or cushion layer in a multi-layer construction. In some embodiments, this is achieved by incorporating a suitable skin on at least a selected portion of the outer layer.

In some embodiments, one or more varnishes are applied to or included in the outer layer construction. Applying or including a varnish layer to a treated surface may impart writability by, for example, changing surface roughness and, thus, the surface coefficient of friction. In some embodiments, the varnish chemistry may be tailored to achieve compatibility with an ink and/or cohesive formulation.

In addition, if desired a decorative package is provided in an embodiment wherein the exterior surface of the packaging material is metallized or aluminized. If a silver finish is desired, an aluminized surface may be preferred. Other metallizing treatments, e.g., with copper, iron, or alloys, can be used when other colors are desired.

In some embodiments, the outer layer is water impermeable. In some embodiments, the outer layer is sufficiently tear and scuff resistant such that a wrapped article remains secure and protected during shipping and handling. In some embodiments, the outer layer includes one or more materials providing at least one of insulation from thermal or acoustic shock and/or radiation protection.

Cushioning Layer or Portion:

Typically, it is desired that the shipper or packaging construction provide some degree of shock and/or impact resistance to prevent damage to or of the article or item being shipped. This can be achieved by incorporation of a cushioning layer or portion in the packaging material or construction. The cushioning layer or portion can be any desired layer that provides cushioning to the item wrapped in the packaging materials or constructions described herein. In some embodiments, the cushioning layer or portion can also provide one or more of structural integrity, shock absorption capability, flexibility, and/or interfacial function with other components of the shipper or packaging construction. In some embodiments, it is desired that the cushioning layer or portion have a relatively low profile to avoid excess shipping costs and/or undesirable bulk which could make packaging more complicated and/or storage more challenging.

In some embodiments, the cushioning layer or portion is a single layer. In some embodiments, the cushioning layer or portion includes multiple layers. In some embodiments, the cushioning portion has a thickness of between about 1/32 inch and about 4 inches. In some embodiments, the cushioning portion has a thickness of greater than about 1/32, or about 7/64 inch, or about 1/4 inch, or about 1/2 inch, or about 3/4 inch, or about 1 inch. In some embodiments, the cushioning portion has a thickness of less than about 4 inches, or less than about 3 inches, or less than about 2 inches, or less than about 1 inch, or less than about 3/4 inch, or less than about 1/2 inch.

In some embodiments, the cushioning layer or portion is selected from materials that deform or crush to reduce resultant levels of shock and vibration upon enclosed articles, preferably below critical thresholds for damage for the articles. Illustrative examples of materials suitable for use in cushion members herein include such materials as foams layers (including expanded foams, structured foams, and contoured foams), bubble films or wraps, and structured polymers (e.g., honeycomb structures).

Bubble Wraps or Films:

In some embodiments, the cushioning layer includes bubble wrap or bubble film. As used herein, the terms "bubble film" and/or "bubble wrap" are meant to include all pliable, polymeric materials including spaced, protruding air or gas-filled bubbles that are capable of providing cushioning. The term is meant to include those items referred to as bubble wrap, bubble pack, bubble paper, air or gas bubble packing, bubble wrapping, and aeroplast. Some embodiments of a bubble film or bubble wrap include a first thin flexible layer of plastic or polymeric material having a plurality of spaced apart recesses in one surface and at least a second thin flexible layer of plastic material bonded to the one surface of the first layer to seal air or gas into the recesses. The bubble film or bubble wrap can include, for example, polyethylene as the plastic material for example, a linear low density polyethylene, a low density polyethylene and/or a high density polyethylene. However, other suitable plastics or polymers may also be used, such as, for example, polypropylene. Some commercially available bubble films or bubble wraps include, for example, Scotch™ Cushion Wrap. The bubble film or bubble wrap described, assigned to the present assignee can also be used, and this application is incorporated herein in its entirety.

In some embodiments, the bubble wrap or film includes a bubble portion and a bubble film portion. In some embodiments, the bubble wrap or bubble film includes a bubble portion, a bubble film portion, and a and a top film or protective film or layer directly adjacent to the bubble portion. In some embodiments, the bubble wrap or film includes only the bubble portion and the bubble portion is applied or directly adjacent to another layer (e.g., the outer layer or the cohesive layer).

In some embodiments, the bubble wrap or bubble film has a thickness of between about 1/32 inch and about 1/2 inch. In some embodiments, the bubble film or bubble wrap has a thickness of greater than about 1/32, or about 7/64 inch, or about 1/4 inch. In some embodiments, the bubble film or bubble wrap has a thickness of less than about 1/2 inch, or less than about 1/4 inch, or less than about 1/8 inch.

Foam:

In some embodiments, the cushioning layer includes foam. Exemplary foams can include, for example, polyethylene, polyester, acrylic, polyurethane, polypropylene, and/or styrene. In some embodiments, the foam is structured. Exemplary structured foam examples include Carbon Core structural foam-filled plastic honeycomb and CMI Composites AC-PFH phenolic foam filled honeycomb. In some embodiments the cushioning layers include one or more contoured foam materials. Contoured foam materials are typically made by different methods including convoluted cut, hot wire, embossing, CNC, and machining grooves. Some exemplary commercially available contoured foam materials include, for example, EverFlex™ 3-inch Soft Egg Crate Foam, Feldherr FSNP050 50 mm (2 inches) Convoluted foam, and Hushcloth® Densified Embossed Foam.

In some embodiments, the foam has a thickness of between about ⅟32 inch and about 3 inches. In some embodiments, the foam has a thickness of greater than about ⅟32, or about ⁷⁄64 inch, or about ¼ inch, or about ½ inch, or about ¾ inch. In some embodiments, the bubble film or bubble wrap has a thickness of less than about 3 inches, or less than about 2.5 inches, or less than about 2 inches, or about 1.5 inches, or about 1 inch, or about ¾ inch, or about ½ inch.

Structured Polymers:

In some embodiments, the cushioning layer or portion includes structured polymers (e.g., honeycomb structures). Some exemplary commercially available structured polymers include, for example, Stimulite® Classic XS Cushion and Purple® Hyper-Elastic Polymer™ Smart Comfort Grid™

Cohesive Layer or Portion:

As used herein, the term "cohesive" means an adhesive that adheres substantially to itself and not substantially to other materials. In some embodiments, the cohesive composition is non-tacky to the touch at ambient temperatures. In some embodiments, cohesive compositions and/or articles have a tack of less than 30 grams when measured by a TA-XT2i Texture Analyzer according ASTM D-2979. In some embodiments, the tack (when measured as described above) is less than 20 grams, or less than 10 grams.

In some embodiments, the cohesive composition, layer, portion, or material includes less than about 20 wt % tackifier, plasticizer, and/or mixtures thereof based on the total weight of the cohesive composition. In some embodiments, the cohesive composition, layer, portion, or material includes less than about 15 wt %, or less than about 10 wt %, or less than about 5 wt % tackifier, plasticizer, and/or mixtures thereof based on the total weight of the cohesive composition.

In some embodiments, the cohesive composition, layer, portion, or material is co-adherent to itself while being able to contact other surfaces without substantially sticking, damaging, or leaving a residue which would otherwise mar the surface or damage the other surface(s). In some embodiments, the cohesive composition, layer, portion, or material will remove cleanly from an adjacent article (i.e., without damaging the article) while adhering sufficiently strongly to itself and/or to another cohesive surface so as to create a strong bond that is sufficient to stay adhered or bonded in the desired configuration or orientation during use. In some embodiments, the cohesive composition, layer, portion, or material and/or the packaging construction is capable of being cleanly removed from an article to which it has been exposed, meaning that it does not damage and/or leave significant residue on the article when it is removed from the article. The cohesive composition, layer, portion, or material is preferably sufficiently adhesive to itself and to the other surface of the cushioning layer or portion so that it creates a strong bond that is sufficient to stay adhered or bonded in the desired configuration or orientation while the package is being shipped. This may include travel through varying temperatures (e.g., in the heat of a truck driving through the Arizona desert in July and being outside on a customer's doorstep in Alaska in January). This may also include jostling and tossing of the package during transit and delivery.

In some embodiments, a cohesive composition, layer, material, or portion is adjacent to the cushioning layer or portion. The cohesive composition can be adjacent to either major surface of the cushioning layer or portion. For example, where the cushioning layer or portion is a bubble wrap or film including a bubble portion and a film portion, the cohesive composition, layer, material, or portion can be adjacent to either the bubble portion or the film portion of the bubble wrap or film. Further, in some embodiments, the cohesive composition, layer, material, or portion can be directly adjacent to the bubble portion of the bubble wrap or film where bubble wrap or film is the cushioning layer or portion.

The cohesive layer, material, or portion can be single or multi-layer. The cohesive layer, material, or portion can be directly adjacent to/directly contact the cushioning layer or portion or layers or portions can be between the cohesive layer or portion and the cushioning layer or portion. In some embodiments, an adhesive layer or portion is between the cohesive layer or portion and the cushioning layer or portion.

In some embodiments, one major surface of the cushioning layer is cohesive. In such embodiments, at least one major surface of the cushioning layer includes or is adjacent to a cohesive material or layer.

Any cohesive material may be used. In some embodiments, the cohesive layer, material, or portion includes at least one of natural rubber, synthetic polyisoprene, block copolymer, amorphous poly alpha-olefin, polyurethane, and blends or combinations of the foregoing. In some embodiments, the cohesive layer, material, or portion includes a cohesive material described in U.S. Patent Application Nos. 62/717,942 and 62/775,811, the entirety of each of which is incorporated herein by reference.

In some embodiments, the cohesive layer, material, or portion is a thin layer of plastic material including a tackifier sufficient to enable the adhesive to adhere to itself. In some embodiments, the tackifier is homogeneously dispersed in the plastic layer. In some embodiments, the tackifier includes at least one of a rosin ester, hydrocarbon resin, terpene resin, and derivatives or blends of them. The one or more plasticizers can also be incorporated into another material such as, for example, a mineral oil.

In some embodiments, the cushioning layer includes one or more plastic layers including a tackifier dispersed in at least one of the layers of plastic material in order to impart a co-adhesive characteristic to the layer sufficient to permit this layer to co-adhere to itself and to be wrapped about a foreign object or laid over a foreign object without leaving a residue. The tackifier which is used may be dispersed in either or both of the layers of the laminated packaging material. In some embodiments, the tackifier is homogeneously dispersed in the layer.

In some embodiments, the cohesive material, layer, or portion is applied to substantially (e.g., at least 50% of the total surface area) all of one major surface of the cushioning layer or portion. In some embodiments, the cohesive material or layer is applied to at least 55%, or at least 60%, or at least 65%, or at least 70%, or at least 75%, or at least 80%, or at least 85%, or at least 90%, or at least 95%, or at least 97%, or at least 99% of the total surface area of one major surface of the cushioning layer or portion.

In some embodiments, it may be desirable to coat less than the entire surface of the cushioning layer. In some such embodiments, a screen type roller or rotary screen printing device can be used to selectively apply the cohesive coating upon only specific areas of the cushioning layer. Alternatively, a spray head or series of spray heads may be used to selectively deposit a particular or random pattern. The pattern can be arranged to achieve a desired cohesive adhesion.

In some embodiments, the cohesive material, layer, or portion is discontinuous (e.g., pattern coated) or portions of the major surface of the cushioning layer will be free of cohesive layer, material, or portion.

Adhesive Layer or Portion:

In some embodiments, the packaging material or construction includes an adhesive layer, portion, material, coating, or tape between one or more layers or portions of the packaging material or construction. In some embodiments, an adhesive is between the cushioning layer or portion and the outer layer or portion to hold these two layers or portions closely adjacent to one another. In some embodiments, an adhesive is between the cushioning layer or portion and the cohesive layer or portion to hold these two layers or portions closely adjacent to one another. In some embodiments, an adhesive is between layers in a multilayer cushioning, outer, or cohesive layer or portion. In other words, any of the cushioning, outer, or cohesive layers or portions can be multilayered, and in such multilayered instances, one or more of the layers in the cushioning, outer, or cohesive layer or portion can be one or more adhesive materials or layers. Any desired adhesive may be used. Some exemplary adhesives include, for example, rubber, acrylic, polyurethane, epoxy, or EVA latex. In some embodiments, one or more transfer adhesives can be used.

In some embodiments, the adhesive layer, portion, material, coating, or tape covers substantially the entire major surface of the cushioning layer and/or the outer layer. In other embodiments, the coating may be discontinuous (e.g., pattern coated) or portions of the major surface of the cushioning layer and/or the outer layer will be free of adhesive coating (e.g., one or more edges left uncoated).

Depending upon the characteristics of the cushioning layer and/or the outer layer used and the adhesive that is selected, a priming material or treatment may be used to improve properties of that interface. Illustrative examples of materials which can be use as primers include Scotch® Super 77™ Multi-Purpose Spray, air or nitrogen corona treatment, chlorinated polyolefin, and polyethyleneimine Roll:

The packaging materials of the present disclosure can be made in, for example, a roll or a flat sheet. In embodiments where the material is made and/or stored as a roll or roll good, because the cohesive layer or material only substantially sticks to itself and only one surface of the packaging material contains the cohesive layer or material, when the packaging material is rolled up, the coated surfaces do not make contact and no barriers are required to prevent the sheeting from sticking to itself while stored on the roll. Some other embodiments include a liner adjacent to the cohesive layer, material, or portion.

Figure 5:
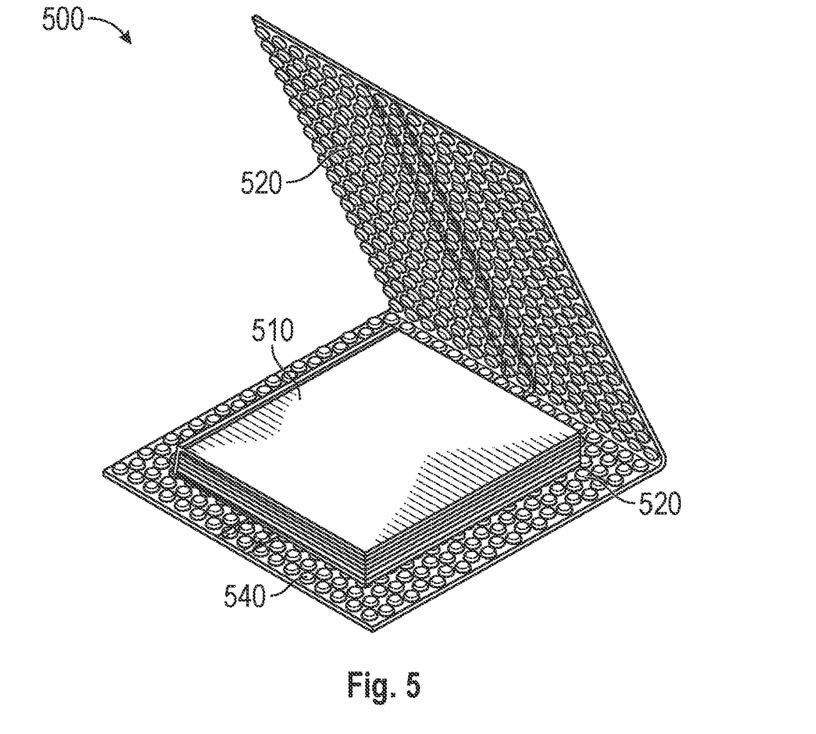
FIGS. 5 and 6 are schematic drawings of an exemplary packaging material or construction in use.

Methods of Use:

Use of the packaging material or construction is simple and intuitive. Where the packaging material is in the form of a roll or roll good, the user unrolls a portion of the material from the roll and cuts the desired portion to separate it or remove it from the roll. Where the packaging material is provided in a flat position, the material is simply cut to a desired length. The packaging material can then be placed on a flat surface with the outer surface down/on the flat surface and the cohesive layer upward/exposed to the user. As shown schematically in FIG. 5, the item or article to be shipped 510 is placed on the exposed cohesive surface 520 of the packaging material 500. The cohesive surface/material 520 does not substantially stick to the goods. In some embodiments, it may be preferred that the item or article 510 is placed in the center or middle of the packaging material 500. In some embodiments (as shown), it may be preferred that the item or article 510 is placed in the first or second half of the packaging material 500 cut.

Figure 6:
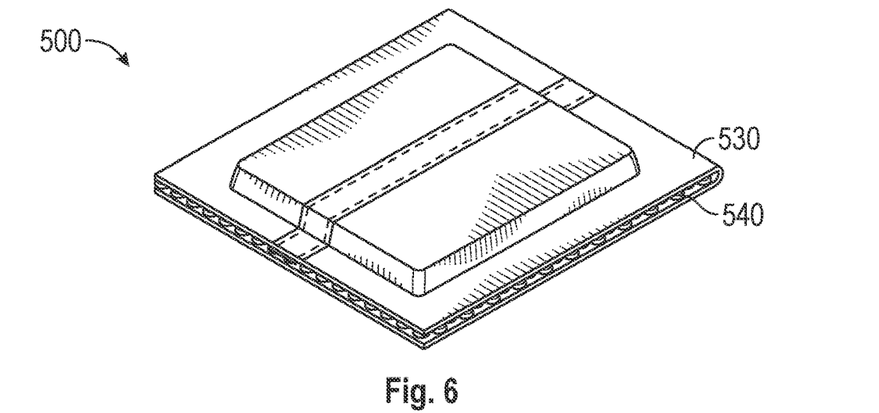

As shown in FIG. 6, the packaging material 500 is then folded over and about the article or item to be shipped 510. In this step, the opposing cohesive layer or material coated surfaces 520 of the packaging material 500 come into contact with one another thereby enclosing the article or items to be shipped 510. Next, the user presses the packaging material 500 together to create a tight bond or seal between the cohesive layers 520 that are now closely or directly adjacent to one another. This step forms cohesive—cohesive bonds between the two adjacent cohesive layers 520, developing a bond to hold the packaging material or construction 500 in the desired configuration so as to function as a self-closing and/or custom fit shipper. In this way, a sealed package with protection—but without excess material—is created.

Figure 7:
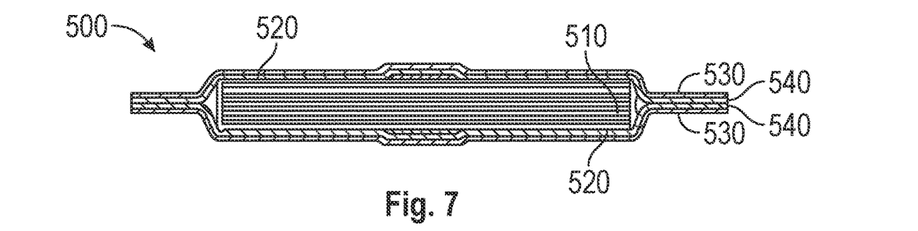
FIG. 7 is a cross-sectional view of the exemplary packaging construction or material of FIGS. 5 and 6 in its final state, wrapped around an item to be shipped.

A cross-sectional, side view of the resulting package is shown in FIG. 7. As shown in FIGS. 6 and 7, the packaging material 500 includes an outer layer 530 adjacent to a cushioning layer 540 adjacent to cohesive layer or material 520. Packaging material 500 wraps around the item to be shipped 510.

Figure 8:
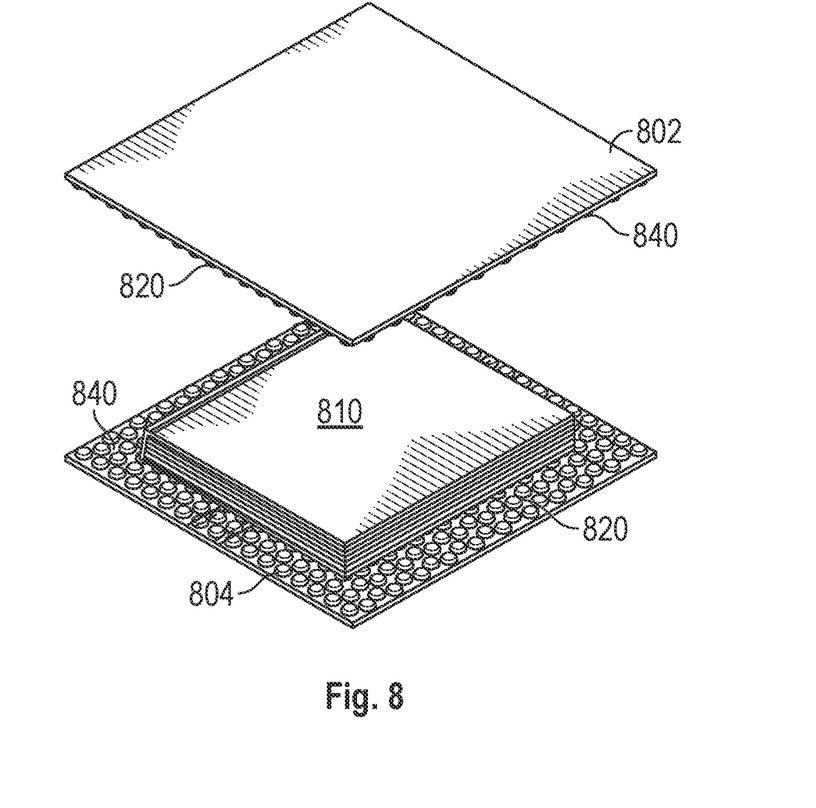
FIGS. 8 and 9 are schematic drawings of an exemplary packaging material or construction in use.
Figure 9:
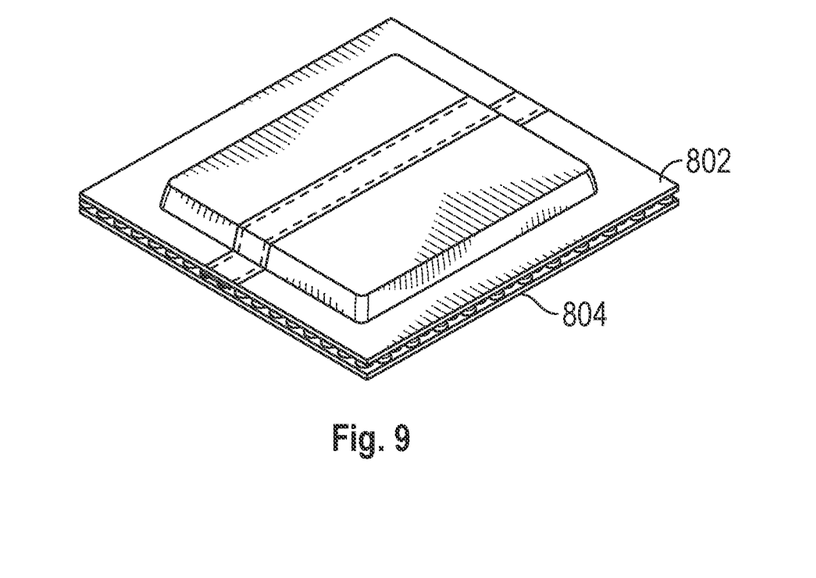

Alternatively, instead of packaging an article or item with one unitary sheet of packaging material, it may be desirable to use two separate sheets of packaging material, wherein at least a portion of each sheet has a layer of cohesive material. The two sheets of packaging material are each cut to the desired length. As is shown in FIG. 8, a first piece of packaging material 802 is placed flat on a surface, and the article or item to be mailed 810 is placed on top of the first piece of packaging material 802. The cohesive material or layer 820 does not stick to the items to be shipped 810 because the cohesive material or layer 820 only sticks to itself. A second piece of packaging material 804 is placed on top of the item 810 and the first piece of packaging material 802 such that the cohesively coated surfaces of each piece of packaging material 802 and 804, respectively, are adjacent to one another. The user then presses the two layers 802 and 804 together. This ensures that the directly adjacent portions of the packaging material including the cohesive material or layer 820 form cohesive—cohesive bonds and the article or item is enclosed within the packaging material, thereby forming a self-closing and/or custom-fit package.

The packaging material can be used in manual wrapping. This packaging material may be of great benefit to those who mail and ship goods relatively infrequently (e.g., the home-maker sending a care package or birthday gift a few times a year) as well as those individuals who frequently ship items through online sites or services like Etsy or eBay. This packaging material allows such users to store only a single packaging material that will work for all of their needs while ensuring safe and protected transit and deliver of their item.

The packaging material can also be used in automated wrapping equipment, wherein the resultant package is automatically wrapped by a machine generally known in the art. Such use may be preferred by, for example, companies or corporations who manufacture or ship large volumes of goods. Use of this material would ensure protection of the goods but decrease shipping cost since a smaller package is being shipped while affording the same or better protection of the item. Further, the packaging material provides enhanced sustainability goals since environmental waste is reduced because (1) less air is being transported during shipment; and (2) less packaging is used to safely ship the item, resulting in less waste.

Benefits:

The packaging materials and constructions of the present disclosure have many benefits. At least some of the benefits of these constructions or material are as follows. The packaging materials occupy less space and/or have a smaller or lower profile while providing the same protection as bulkier or thicker prior art embodiments. As a result, the packaging materials take up less space during storage, both on store shelves and in a user's home or office. Further, they cost less to ship because of their reduced profile and/or size. This is not only a benefit to manufacturers and those paying for shipping, but it's also a sustainability benefit because less gas is being used and less pollution is being produced per shipment.

Further, the packaging materials and constructions described herein are capable of packaging articles of various sizes and shapes. The user has full control over the size and shape of the material used and the package created. In this way, the shippers or packages created can be truly custom-made and/or custom-fit. This also ensures that the item being shipped is fully protected while reducing environmental waste and/or excess shipping cost.

The following examples describe some exemplary constructions of various embodiments of the packaging constructions and methods of making the packaging constructions described in the present application. The following examples describe some exemplary constructions and methods of constructing various embodiments within the scope of the present application. The following examples are intended to be illustrative, but are not intended to limit the scope of the present application.

EXAMPLES

The present disclosure is more particularly described in the following examples that are intended as illustrations only, since numerous modifications and variations within the scope of the present disclosure will be apparent to those skilled in the art.

Example 1

A Scotch® Bubble Cushion Mailer (small bubble with poly outer, made by 3M Company of St. Paul, Minn.) was cut open along its seams to form a flat open sheet with the protective poly outer forming one major surface and the bubble layer forming the second major surface. A permanent transfer adhesive (3M 9472LE, made by 3M Company of St. Paul, Minn.) was applied by hand pressure to substantially all of the exposed bubble portion of the cut-open bubble cushion mailer. The polyethylene side of a cohesive film (Pack & Guard® Cohesive Film, Pregis Co. Deerfield, Ill.) was then applied by hand pressure to substantially all of the exposed surface of permanent transfer adhesive. The resulting construction was similar to that shown in FIG. 2B in that it included an outer layer or portion, a cushioning layer or portion, an adhesive layer or portion, and a cohesive layer or portion.

Example 2

A Scotch® Bubble Cushion Mailer (small bubble with polymeric outer, made by 3M Company of St. Paul, Minn.) was cut open along its seams to form a flat open sheet with the protective poly outer forming one major surface and the bubble layer forming the second major surface. A cohesive film including a polymeric film portion and a cohesive portion was obtained (Pack & Guard® Cohesive Film, 3 mil, made by Pregis, Deerfield, Ill., US). The polymeric film portion of the cohesive film was laminated to the exposed bubble portion of the Bubble Cushion Mailer using a Deluxe Heat Gun (model number H-491, ULINE, Pleasant Prairie, Wis., USA) operating on the high setting until the polyethylene of the cohesive film was permanently heat bonded to the exposed bubbles. The resulting construction was similar to that shown in FIG. 2A in that it included an outer layer or portion, a cushioning layer or portion, and a cohesive layer or portion.

Example 3

A permanent transfer adhesive (3M 9472LE made by 3M Company, St. Paul, Minn.) was adhered using hand pressure to substantially all of the non-decorative side of a sheet of decorative paper (Black Ink™ Screenprinted Lokta Paper made by Dick Blick Art Materials, Galesburg, Ill., USA) to form a multi-layer construction. The exposed bubble film portion of Cold Seal Bubble Roll (small bubble with one side cohesively coated, made by ULINE, Pleasant Prairie, Wis., USA) was then adhered by hand pressure to the exposed transfer adhesive portion of the multi-layer construction formed above. The resulting construction was similar to that shown in FIG. 3 in that it included an outer layer or portion (the decorative sheet), an adhesive layer or portion, a cushioning layer or portion, and a cohesive layer or portion.

Example 4

A label stock (3.8 White Optiflex V344 made by AWT Labels and Packaging, Minneapolis, Minn., USA) was laminated to the outer film layer (the layer opposite the exposed bubble) of a layer of bubble wrap (S-3928P, 3/16 inch bubble made by Uline, Pleasant Prairie, Wis., USA) using 0.125 inch shims at 40 psi of nip pressure on an AGL (Advanced Greig Laminator) Model 72 laminator made by Pictographics of Las Vegas, Nev. 3M™ Adhesive Transfer Tape 965 (made by 3M Company, St. Paul, Minn., USA) was applied to the exposed bubble portion of the bubble wrap using 0.125 inch shims at 40 psi of nip pressure on an AGL (Advanced Greig Laminator) Model 72 laminator made by Pictographics of Las Vegas, Nev. Then the liner from the adhesive transfer tape was removed. The film side of a cohesive film (SG PolyMask 1025L silver/white cohesive made by Pregis, Deerfield, Ill., USA) was laminated to the exposed adhesive of the adhesive transfer tape using 0.125 inch shims at 40 psi of nip pressure on an AGL (Advanced Greig Laminator) Model 72 laminator made by Pictographics of Las Vegas, Nev. The resulting construction was similar to that shown in FIG. 2B in that it included an outer layer or portion, a cushioning layer or portion, an adhesive layer or portion, and a cohesive layer or portion.

Example 5

A cohesive film (SG PolyMask 1025L silver/white cohesive made by Pregis, Deerfield, Ill., USA) was laminated to the exposed bubble portion of a bubble film (Bubble Roll, 7/64 inch bubble made by PAC Worldwide, Middletown, Ohio USA) at a lamination temperature of between about 180-240° C. and at a run rate of between about 32-60 meters/minute. Following liner removal, the adhesive side of a label stock (3.8 White Optiflex V344 made by AWT Labels and Packaging, Minneapolis, Minn., USA) was laminated to the outer film layer of the bubble film using 0.125 inch shims at 40 psi of nip pressure on an AGL (Advanced Greig Laminator) Model 72 laminator made by Pictographics of Las Vegas, Nev. The resulting construction was similar to that shown in FIG. 2A in that it included an outer layer or portion, a cushioning layer or portion, and a cohesive layer or portion.

Example 6

3M™ Adhesive Transfer Tape 965 (3M Company, St. Paul, Minn., USA) was applied by hand to substantially all of the exposed bubble portion of a bubble film (Bubble Roll, 3/16 inch bubble made by PAC Worldwide, Middletown, Ohio, USA). A hand roller Marshalltown E54D 2 inch Flat Seam Roller) was then rolled over substantially all of top major surface of the construction twice. Next, the film side of a cohesive film (the cohesive film of Example 16 from U.S. Provisional Application No. 62/775,811, the disclosures of which is hereby incorporated herein by reference) was applied by hand to the exposed adhesive from the adhesive transfer tape. The hand roller (Marshalltown E54D 2 inch Flat Seam Roller) was then rolled over substantially all of top major surface of the construction twice. The resulting construction was the same as the construction shown in FIG. 2B.

Example 7

The exposed bubble portion of a bubble film (Bubble Roll, 3/16 inch bubble made by PAC Worldwide, Middletown, Ohio, USA) was laminated to the film side of a cohesive film (the cohesive film of Example 16 from U.S. Provisional Application No. 62/775,811, the disclosure of which is hereby incorporated herein by reference) at a lamination temperature of between about 180-240° C. and at a run rate of between about 32-60 m/minute. The resulting construction was the same as the construction shown in FIG. 2A.

The following were used as Comparative Examples:

TABLE 1

Comparative Examples

| | Description | Source |
|---|---|---|
| Comp. A | Nyvel ® HD | Automated Solutions LLC, Sawmills, NC, USA |
| Comp. B | Cro-nel ® MD | Automated Solutions LLC, Sawmills, NC, USA |
| Comp. C | Cro-nel ® Plus Regular | Automated Solutions LLC, Sawmills, NC, USA |
| Comp. D | Scotch ™ Bubble mailer (4" × 7.25") | 3M Company, St. Paul, MN, USA |
| Comp. E | Scotch ™ Bubble mailer (8.5" × 11.25") | 3M Company, St. Paul, MN, USA |
| Comp. F | Uline Cold Seal Bubble Roll (S-818) | Uline, Pleasant Prairie, WI, USA |
| Comp. G | Corrugated box (S-4040 4" × 4" × 4") | Uline, Pleasant Prairie, WI, USA |
| Comp. H | Corrugated box (S-4062 6" × 6" × 6") | Uline, Pleasant Prairie, WI, USA |
| Comp. I | Corrugated box (S-4103 10" × 8" × 6") | Uline, Pleasant Prairie, WI, USA |
| Comp. J | Poly shipping bag (S-3354 10" × 13") | Uline, Pleasant Prairie, WI, USA |

Package or Container Sample Preparation

Sample containers or packages using the material described in the Examples above were prepared as follows.

Sample containers or packages made using a cohesive or adhesive coated sheet (Examples 1-7 and Comparative Examples A-C and J) were formed by taking a sheet or piece of material and folding it over itself so that two exposed cohesive surfaces faced one another. The resulting generally rectangular construction was then pressed by hand pressure along three of the four edges to seal those edges or adhere them together. The resulting construction was then opened along its open edge to permit placement of the item to be shipped or Drierite™ material inside of the package. Material or items were added. The construction was then sealed by the fourth (top) edge of the package by pressing the two cohesive coated portions together using hand pressure to form a generally rectangular shape.

Box sample containers or packages of Comparative Examples D-F were formed by forming a box structure and then sealing the bottom of the structure using standard packaging tape (e.g., Scotch Packaging Tape made by 3M Company). The item to be shipped or Drierite™ material was placed inside of the box, and standard packaging tape (e.g., Scotch Packaging Tape made by 3M Company) was used to seal the top of the box.

Mailer envelopes of Comparative Examples G-I were opened along their top edge to permit placement of the item to be shipped or Drierite™ material inside of the mailer envelope. Material or items were added. The mailer envelope was then sealed by removing the liner and then adhering the exposed adhesive strip to the opposing mailer surface. The adhesive seal was then secured using hand pressure along its length.

Test Methods:

Water Resistance Test

Figure 1:
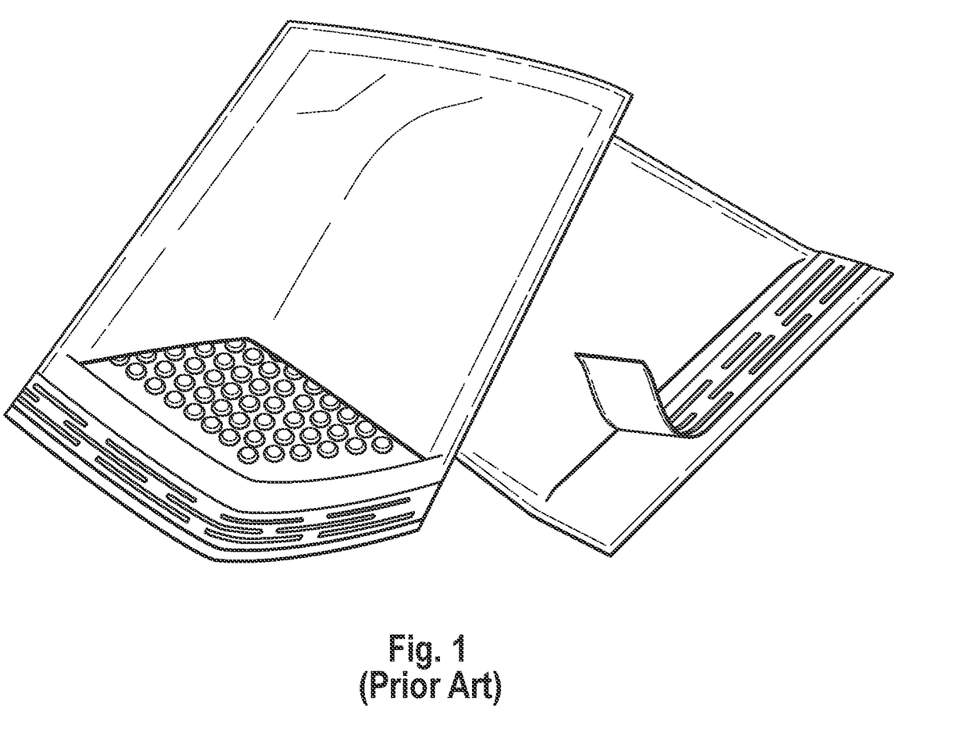
FIG. 1 is a perspective view of an exemplary prior art cushioned envelope.

ASTM D951-17 is the standard method for testing water resistance of shipping containers by a spray method. A spray apparatus system as shown in FIG. 1 of ASTM D951-17 was constructed and the ASTM D951-17 test method was used except that only two samples (instead of 3) were tested. Each sample was weighed prior to being placed in the testing apparatus. The test was conducted at room temperature, for one half hour in duration, at a spray intensity of 4 inches per hour. At the end of testing, the samples were removed from the apparatus, wiped for surface water with a tissue, then re-weighed. Weight gain was recorded.

Water Presence Test

Drierite™ (commercially available from W. A. Hammond DRIERITE Co. LTD, Xenia, Ohio, USA) is an indicator material that indicates the presence of water by turning from blue to violet when exposed to water. Once the package or container was prepared as described above, Drierite™ was poured into the sample container or package to coat the bottom surface. The Water Resistance Test of ASTM D951-17 was conducted. Following completion of the Water Resistance Test of ASTM D951-17 as described above, the sample packages or containers were cut open to analyze the Drierite™ in the package for visible color change.

Samples run through the Water Resistance and Water Presence Tests showing no visible color change and negligible weight gain were considered to have passed the test. Samples with visible color change and/or greater than negligible weight gain were considered to have failed the test. The test results are shown in Table 2 below.

TABLE 2

Water Resistance and Presence Test Results

| Package Container Material | Weight gain | Water Presence Test Results | Pass/Fail |
|---|---|---|---|
| Comp. A | 1.9 grams | No visible color change | Pass |
| Comp. B | 1.5 grams | No visible color change | Pass |
| Comp. C | 0.2 grams | No visible color change | Pass |
| Comp. D | 82 grams | Visible Color Change | Fail |
| Comp. F | 4 grams | No visible color change | Pass |
| Comp. G | 17 grams | Visible Color Change | Fail |
| Example 5 | 0.5 grams | No visible color change | Pass |

Package-Product Drop Test

ISTA 3A is the standard method to test Packaged-Products for Parcel Delivery System Shipment. The Drop Test portion of ISTA 3A was performed; the vibration testing was not performed.

Sample container or packages were prepared as described above.

In a first round of testing, a jar of peanuts (Nature's House brand dry roasted peanuts; 7.5 oz in a plastic jar weighing 248 grams) was placed and sealed inside the sample container or package formed as described above, and the drop test was performed on those samples. Test results for these drop tests are provided below in Table 3.

In a second round of testing, a hardcover book ("The Other Son" by Alexander Söderberg; size of 9.5 in ×6.5 in ×1.25 in with a weight of 630 grams) was placed and sealed inside the sample container or package formed as described above, and the drop test was performed on those samples. Test results for these drop tests are provided below in Table 4.

All of the package samples tested were classified as small packaged products under ISTA 3A and had a weight of less than 32 kg. As such, the sample packages were all dropped from a height of 460 mm 7 times, then an 8th drop from 910 mm, then a final ($9^{th}$) drop from 460 mm in the orientations listed in ISTA 3A. After the 9 drops were completed, each sample package was opened and the items were inspected for damage.

TABLE 3

Package-Product Drop Test Results - Peanut Jar in Package

| Package Container Material | Drop Test |
|---|---|
| Comp. A | Pass |
| Comp. B | Pass |
| Comp. C | Pass |
| Comp. E | Pass |
| Comp. F | Pass |
| Comp. H | Pass |
| Comp. J | Pass |
| Example 5 | Pass |

TABLE 4

Package Drop Test Results - Hardcover Book in Package

| Package Container Material | Book Drop | Observations |
|---|---|---|
| Comp. A | Pass | |
| Comp. B | Fail | Corner damage |
| Comp. C | Pass | |
| Comp. E | Fail | Corner damage |
| Comp. F | Pass | |
| Comp. I | Pass | |
| Comp. J | Fail | Corner damage |
| Example 5 | Pass | |

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure can be determined with reference to the appended claims, along with the full scope of equivalents to which such claims are entitled.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present application should, therefore, be determined only by the following claims and equivalents thereof.

What is claimed is:

1. A packaging or shipping material comprising
an outer portion,
a cohesive portion that only sticks to itself,
and a cushioning portion between the outer portion and the cohesive portion, wherein
the cushioning portion comprises a bubble film that includes a bubble portion that faces the outer portion and a film portion that faces the cohesive portion;
wherein the outer portion is a multilayer film;
wherein the outer portion comprises polypropylene and polyethylene;
wherein only one surface of the material contains the cohesive portion; and
wherein a layer is present between the cohesive portion and the cushioning portion.

2. The packaging or shipping material of claim 1, wherein the cushioning portion has a thickness of between about 1/32 inch and about 1/2 inch.

3. The packaging or shipping material of claim 1, wherein the cohesive portion is disposed on at least 99% of the total surface area of the film portion of the cushioning portion.

4. The packaging or shipping material of claim 1, wherein the outer portion comprises a pigment.

5. The packaging or shipping material of claim 1, wherein the outer portion has a thickness of greater than 1.75 mils and less than 4 mils.

6. The packaging or shipping material of claim 5, wherein the outer portion has a thickness of greater than 2 mils and less than 3 mils.

7. The packaging or shipping material of claim 1, wherein the cushioning portion has a thickness of between about 1/32 inch and about 1/2 inch.

8. A roll good comprising the packaging or shipping material of claim 1 in the form of a roll.

9. A roll good comprising the packaging or shipping material of claim 7 in the form of a roll.

* * * * *